United States Patent Office 3,030,268
Patented Apr. 17, 1962

3,030,268
PROCESS AND COMPOSITION FOR ATTRACTING AND COMBATTING INSECTS, IN PARTICULAR THE MEDITERRANEAN FRUIT FLY
Alfred Margot, Basel, Switzerland, assignor to J. R. Geigy A.-G., Basel, Switzerland
No Drawing. Filed July 29, 1960, Ser. No. 46,068
Claims priority, application Switzerland July 31, 1959
8 Claims. (Cl. 167—48)

The present invention concerns a process for attracting and combatting insects, in particular the Mediterranean fruit fly (*Ceratitis capitata*), as well as compositions having a content of attractants and insecticides in order to simultaneously attract and combat insects.

Recently attractants have become of particular interest in insect control. The purpose of attractants is to attract injurious insects to certain places in an area infested therewith in order to combat or eliminate them there effectively.

By the term insect attractants, those active substances are meant which cause the insects to move in the direction of the place from which the attraction springs. This means that the attractants must be effective at some distance. They are not the objective for which the insect is searching but signposts in the search for the objective which can be either food, a mate or a place in which to lay eggs.

An insect attractant can have two main objects: namely to determine whether a species of insects is present in a certain area and to control the attracted insects, for example, in combination with a poison or in another manner. An insect attractant should remain active for a long period and, in order to attain the first object, it should be as specific as possible for a species of insects.

The insect attractants known up to the present fall into two groups: native, i.e. produced by the insect itself and alien, natural or synthetic attractants. In nature, principally native sexual attractants play a great part with insects. They are formed generally by the females in certain glands and attract the males.

Empirically found however, as sexual attractants for male insects are also alien organic substances. Thus, for example, caproic acid is an intensive attractant for male Pacific Coast wire worms (*Limonius canus*). Methyl eugenol is the most active attractant known for the Oriental fruit fly (*Dacus dorsalis*). 2-allyloxy-3-ethoxybenzaldehyde attracts both sexes of this species of insect, whereas aromatic compounds containing methoxy groups, in particular the alkoxybenzene derivatives, mainly attract the male Dacus flies. Anisyl acetone is a strong attractant for male melon flies (*Dacus curcurbitae*), the butanone side chain of which is decisive for the attractant action.

The insect which has become most injurious in practice in tropical and subtropical areas is the Mediterranean fruit fly (*Ceratitis capitata*) which annually causes many million francs' worth of damage to cultivated plants. Originally, angelica seed oil was used to combat this pest. The active substance of the oil is probably a sesquiterpene and the oil is an attractant for the Mediterranean fruit fly. As the annual production of angelica seed oil is relatively slight and the price of the oil is very high, attempts have been made to find synthetic attractants for the Mediterranean fruit fly. Gertler, in U.S. Patent 2,851,392, has described esters of 6-methyl-cyclohexene-(3)-carboxylic acid-(1) as good attractants for the Mediterranean fruit fly, particularly for the males.

To effectively control the Mediterranean fruit fly, it is necessary to determine the area infested and the extent of the infestation. This can be done in areas suspected of infestation by setting traps with an attractant. Advantageously the attractant can be combined with an insecticide which kills the flies. A count of the flies caught or killed gives an idea of the extent of infestation of a given area.

According to the invention it has now surprisingly been found that easily accessible thiocarbonic acid esters of the general formula

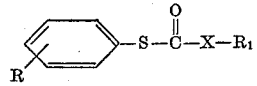

wherein

X represents an oxygen or sulphur atom, especially an oxygen atom,
R represents hydrogen, a halogen atom, especially chlorine or a low molecular alkyl- or alkoxy group, especially the methyl radical, and
$R_1$ represents a low molecular alkyl or alkenyl group, preferably a low molecular alkyl radical with 1–3 carbon atoms, e.g. the methyl, ethyl or isopropyl group, have an excellent attractant action on the Mediterranean fruit fly and can be used, advantageously in combination with an agent for insect control, e.g. with insect traps or insecticidal active substances and, possibly, foodstuffs, for the effective control of this species of insects.

Some of the attractants of the general Formula I are known compounds.

The compounds of the general Formula I can be produced by known methods, for example by reacting a thiophenol, possibly suitably substituted, with a low molecular alkyl ester or alkenyl ester of chloroformic acid.

The following compounds of the general Formula I have proved to be particularly suitable attractants:

Monothiocarbonic acid-S-phenyl-O-methyl ester
Monothiocarbonic acid-S-phenyl-O-ethyl ester
Monothiocarbonic acid-S-phenyl-O-isopropyl ester
Monothiocarbonic acid-S-p-chlorophenyl-O-methyl ester
Monothiocarbonic acid-S-p-tolyl-O-methyl ester
Monothiocarbonic acid-S-o-tolyl-O-isopropyl ester
Monothiocarbonic acid-S-o-tolyl-O-methyl ester
Dithiocarbonic acid-S-phenyl-S-ethyl ester.

To determine the attractant action of the attractants used according to the present invention, 1 mg. of each active substance (0.1 ccm. 1% acetone solution) is put on a round filter paper and after the acetone has evaporated, it is put into a cage occupied by fully developed Mediterranean fruit flies. The number of flies sitting on the filters is counted after 3, 5, and 10 minutes.

In the following table, the results obtained are given as the average of three tests:

| compound | 3′ | 5′ | 10′ |
|---|---|---|---|
| monothiocarbonic acid-S-p-tolyl-O-methyl ester | 31 | 34 | 40 |
| monothiocarbonic acid-S-phenyl-O-methyl ester | 18 | 31 | 33 |
| monothiocarbonic acid-S-p-chlorophenyl-O-methyl ester | 16 | 18 | 18 |
| monothiocarbonic acid-S-o-tolyl-O-isopropyl ester | 12 | 11 | 13 |
| filter without active substance | 0 | 5 | 3 |

Monothiocarbonic acid S-p-tolyl-O-methyl ester and monothiocarbonic acid S-phenyl-O-methyl ester have the best attraction power among the above cited tested compounds of general Formula I.

The active ingredients of the general Formula I can be used to attract and control Mediterranean fruit flies in various ways. Advantageously the attractants are used combined with insecticidal poisons, the insecticide and attractant being used either separately or mixed. 1-isopropyl-3-methylpyrazolyl-(5)-dimethyl carbamate (Isolan), 1-phenyl-3-methylpyrazolyl-(5)-dimethyl carbamate (Pyrolan), 2-dimethylcarbamyl-3-methylpyrazolyl-(5)-dimethyl carbamate (Dimetilan), O,O-diethyl-O-(2-isopropyl - 4 - methyl-pyrimidyl - (6)) - thiophosphate (Diazinon), O,O - dimethyl-S-(1,2-bis-carbethoxyethyl)-dithiophosphate (Malathion), O,O-diethyl-O-p-nitrophenyl-thiophosphate (Parathion), O,O-dimethyl-1-hydroxy-2,2,2-trichlorethylphosphonate (Dipterex), 2,2-dichlorovinyl dimethyl phosphate (DDVP), dimethyl-1-methoxy-2,2-dichlorovinyl phosphate (Chlorophan), 1,1,1-trichloro-2,2-bis-(p-chlorophenyl)-ethane (DDT), isobornylthiocyanoacetate (Thanite), 2-(2 - butoxyethoxy)-ethyl thiocyanate (Lethane 384) have proved to be particularly suitable insecticides for the control of Mediterranean fruit flies.

The agents for attracting and controlling Mediterranean fruit flies according to the invention cna be used as such or as emulsions, suspensions, dusts or sprinkling agents or as other types of preparations, for example, window putty etc. The choice of preparation depends on the intended method of application which, in its turn, depends on the type of plants to be protected and the technical application conditions. Thus, for example, in certain traps, bait trees or parts of a cultivated plant, a limited application is possible which enables sufficient protection to be attained while using a reduced amount of poison, this, possibly, without damaging by insecticides the part of the plant and fruit to be enjoyed.

Dusts and sprinkling agents according to the invention can be produced, for example, by mixing or milling together the active substances with a solid, pulverulent carrier. Talcum, diatomaceous earth, kieselguhr, kaolin, bentonite, calcium carbonate, boric acid, tricalcium phosphate, oyster shells, sawdust, powdered cork, for example, are suitable as carriers.

For the preparation of emulsions, in practice it is generally advantageous first to produce concentrates by combining solid or liquid active ingredients with inert organic solvents and/or capillary active substances. These are monophase or polyphase systems and, with water, can be made into ready-for-use emulsions. Capillary active substances which can be used are both cation active, e.g. quaternary ammonium salts, and anion active such as e.g. salts of aliphatic long chain sulphuric acid monoesters, long chain alkoxyacetic acids and aliphatic-aromatic sulphonic acids. Non-ionogenic capillary active substances which can be used are, e.g. polyethylene glycol ethers of fatty alcohols or dialkyl phenols and polycondensation products of ethylene oxide. Cyclic hydrocarbons such as benzene, toluene, xylene as well as ketones, alcohols and other solvents such as, e.g. ethyl acetate, dioxan, acetone-glycerine or diacetone alcohol are suitable as solvents for the preparation of emulsion concentrates.

Wettable powders suitable for suspension in water, so-called spray powders, can be produced by combining liquid active ingredients with solid pulverulent carriers and capillary active substances.

Preparations of the attractants with putty have proved to be agents with particularly good duration of action, to produce which the active substance is mixed with the putty.

Suitable preparations of the active substances can also be used on wood or glass sheets, on paper, foam rubber, gauze or cords or flexes as baits.

It has also been found that the combination of the attractants with vivid yellow colours increases the attractant action.

The following examples further describe some test methods used to determine the activity of the attractants used according to the invention as well as the application forms thereof.

*Example 1*

The emulsion concentrate of an attractant, e.g. monothiocarbonic acid-S-p-tolyl-O-methyl ester, is made up into a wool fat paste containing 5% attractant. A 5 cm. broad ring of this paste is put round the trunk of a fruit tree and the tree is sprayed with a 0.5% suspension of Diazinon. 10–25 trees in an area of 1 hectare are treated in the same way.

*Example 2*

Little yellow coloured gauze sacks are dipped in a solution containing 1% of insecticide and then filled with earth which has been saturated with an emulsion of monothiocarbonic acid-S-phenyl-O-methyl ester. These sacks are attached at easily visible places to the trees to be protected.

What I claim is:

1. A method of detecting infestations of the Mediterranean fruit fly which comprises using as attractant for the flies a thiocarbonic acid ester of the general formula

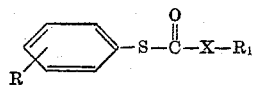

wherein X represents a member selected from the group consisting of the oxygen and sulphur atom,
R represents a member selected from the group consisting of the hydrogen atom, the chlorine atom and the methyl radical, and
$R_1$ represents a low molecular alkyl radical.

2. A method of controlling infestation of the Mediterranean fruit fly which comprises baiting a trap with an attractant comprising a thiocarbonic acid ester of the general formula

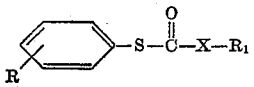

wherein X represents a member selected from the group consisting of the oxygen and sulphur atom,
R represents a member selected from the group consisting of the hydrogen atom, the chlorine atom and the methyl radical, and
$R_1$ represents a low molecular alkyl radical.

3. The method of claim 2 wherein the thiocarbonic acid ester is mixed with a toxicant for the Mediterranean fruit fly.

4. The method of claim 3 wherein the attractant is monothiocarbonic acid S-p-tolyl-O-methyl ester.

5. The method of claim 3 wherein the attractant is monothiocarbonic acid S-phenyl-O-methyl ester.

6. A composition for controlling the Mediterranean fruit fly comprising a toxicant and an attractant having the general formula

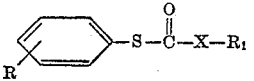

wherein X represents a member selected from the group consisting of the oxygen and sulphur atom,
R represents a member selected from the group consisting of the hydrogen atom, the chlorine atom and the methyl radical, and
$R_1$ represents a low molecular alkyl radical.

7. The composition of claim 6 wherein the attractant is monothiocarbonic acid S-p-tolyl-O-methyl ester.

8. The composition of claim 6 wherein the attractant is monothiocarbonic acid S-phenyl-O-methyl ester.

References Cited in the file of this patent

UNITED STATES PATENTS

| | | |
|---|---|---|
| 2,560,531 | Kipnis | July 17, 1951 |
| 2,851,392 | Gertler | Sept. 9, 1958 |